UNITED STATES PATENT OFFICE.

HENRY JAMSON, OF CATTERICK, ENGLAND.

PAINT AND PROCESS OF MAKING THE SAME.

1,144,599. Specification of Letters Patent. Patented June 29, 1915.

No Drawing. Application filed March 14, 1913. Serial No. 754,352.

*To all whom it may concern:*

Be it known that I, HENRY JAMSON, a subject of the King of Great Britain and Ireland, residing at Catterick, in the county of York, England, have invented certain new and useful Improvements in Paint and Processes of Making the Same; and I do hereby declare the following to be a full, clear, and exact description of the invention, such as will enable others skilled in the art to which it appertains to make and use the same.

The composition comprised in my invention constitutes an improved washable water or water and oil paint which can be used for the painting of wood, stone or plaster the object in view being to provide a paint which is simple in its manufacture and can be made and used without delay; is easily varied and adapted as required in respect of its color or shade; is a perfectly washable paint and is applicable with good results to damp walls.

The component parts of the composition according to my invention which are found to give good results are as follows in their relative proportions:—Linseed oil or substitute, 1 pint; powdered or concentrated size, ½ lb.; water, first instalment, 1 pint; turpentine or substitute, ½ pint; patent driers, ½ lb., or gold size, ½ pint, or liquid drier, ½ pint; water, second instalment, 2 pints; Paris white or coloring powder, 10 lbs.; zinc white or red or white lead, 2½ lbs.; water, final instalment, or equal parts of linseed oil and water or equal parts of linseed oil, turpentine, and water, 4 pints.

The method or process of mixing and combining the above ingredients is as follows:—The powdered or concentrated size is mixed with the boiled linseed oil or its substitute such as fish oil, sperm oil or other oil of a similar character and the first instalment of water is afterward added. When the size is dissolved add the following mixture consisting of turpentine or its substitute such as petroleum, paraffin or petrol, and the patent driers, gold size or liquid driers the previous mixture having been removed from the fire beforehand for reasons of safety and all is then mixed together after which add the second instalment of water. Following this the Paris white or coloring powder mixed with zinc white or red or white lead is added and mixed into a paint paste which can be tinted with coloring paste ground in oil or turpentine.

I wish it to be understood that I do not confine myself to the exact details especially if the ingredients vary, their several intended effects being as follows: Oil resists the suction of the material to be painted. Size helps the oil to mix with water. Turpentine hardens the paint and makes it work smoother and easier. Patent driers gold size and liquid driers cause the paint to dry to a firm surface and should be slightly increased when the substitutes are used. Paris white gives the paint a body. Zinc white or red or white lead the same while increasing the covering effect. Finally the third instalment of water is added warm and the mixture is then thinned for use and if no particular absorption of the material is to be contended with the water may be added alone, otherwise instead of water alone a mixture of water and linseed oil in equal parts should be added or if a hard setting paint is desired linseed oil and turpentine should be mixed with the water in equal parts.

I am aware that many of the ingredients used in my composition have been employed in a variety of other compositions and mixtures in different combinations and mixed or combined by different methods or processes but so far as I am aware the combination and method of attaining the composition as hereinbefore described and which forms the subject of my claim has not been previously used.

As hereinbefore specified I may employ linseed oil or any other well known equivalent thereof suitable for use in paints, and as before stated I may employ turpentine or a suitable well known substitute therefor. Therefore, when in the claims I specify linseed oil and turpentine I mean to include the equivalents thereof.

Having thus described my invention, what I claim and desire to secure by Letters Patent of the United States is:—

1. A paint, consisting of the following ingredients mixed in substantially the proportions specified: linseed oil, size, turpentine, a drier, Paris white, zinc white and water.

2. The process of making a washable paint, consisting in mixing size with boiling linseed oil, adding water thereto, mixing therewith a drier and turpentine, adding water thereto and thoroughly mixing, adding coloring matter to the previously formed mixture and mixing the whole into a paste.

In testimony whereof, I affix my signature, in presence of two witnesses.

HENRY JAMSON.

Witnesses:
 GEORGE JAMES CLARKSON,
 EDWARD THOMAS ELCOAT.

Copies of this patent may be obtained for five cents each, by addressing the "Commissioner of Patents, Washington, D. C."